M. J.-B. Barbarou
INVENTOR

Aug. 1, 1933.    M. J-B. BARBAROU    1,920,674
VARIABLE PITCH PROPELLER
Filed April 8, 1930    2 Sheets-Sheet 2
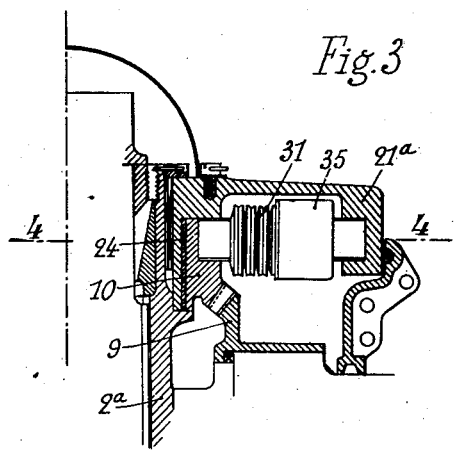
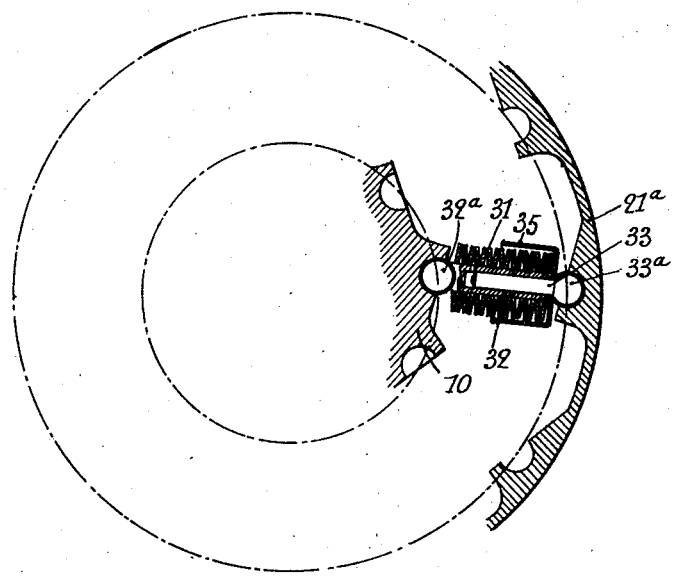
M. J. B. Barbarou
INVENTOR
By: Marks & Clerk
Attys.

Patented Aug. 1, 1933

1,920,674

UNITED STATES PATENT OFFICE 1,920,674

VARIABLE PITCH PROPELLER

Marius Jean-Baptiste Barbarou, Neuilly-Sur-Seine, France

Application April 8, 1930, Serial No. 442,656, and in France May 11, 1929

5 Claims. (Cl. 170—162)

The invention relates to a variable pitch propeller. In order that the power of an engine, applied to a propeller, should be utilized with the maximum efficiency, it is advantageous to modify the pitch of the propeller according to the altitude of flight.

This modification may be effected by hand control, but this requires a complicated mechanism and additional attention on the part of the pilot.

The present invention relates to a variable pitch propeller in which the rotation of the blades is caused by the centrifugal force exercised upon the propeller blades, whereby an entirely automatic control is obtained.

According to one embodiment of the invention, the centrifugal force is absorbed by a helical race provided with balls, affording a tangential reaction which is balanced by a set of springs. Any variation of the speed will vary the centrifugal force and hence the tangential reaction, and the flexibility of the springs being selected according to the amount of rotation which is to be obtained, this finally produces a variation of the pitch of the propeller, that is, an increase or decrease of the resisting torque of the propeller.

According to another feature of the invention, the displacement of the cage maintaining the balls is controlled by a set of levers adapted to assure the proper relation between the rotation of the blade and the movement of said cage.

In the accompanying drawings, which are given solely by way of example:

Fig. 3 is a partial section, corresponding to Figure 1, of a modification.

Fig. 4 is a partial section on the line 4—4 of Figure 3.

Figures 1, 2:
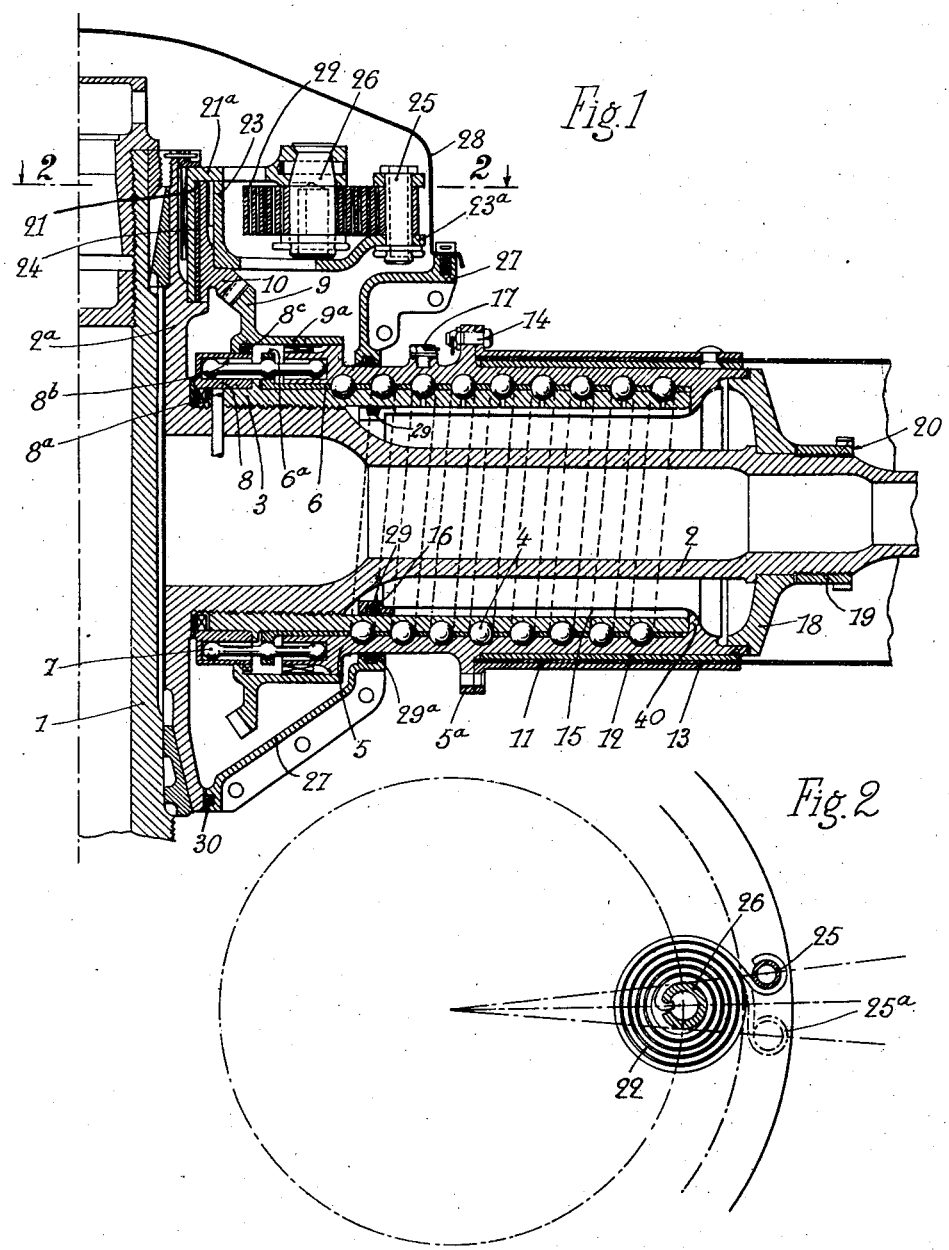
Fig. 1 is a partial section of the propeller along the axis of the crankshaft.
Fig. 2 is a partial section on the line 2—2 of Figure 1, showing the disposition of the springs adapted to balance the tangential force.

In the form of construction shown in Figure 1, to the end 1 of the driving shaft is keyed the hub 2a of a propeller, comprising a tubular shaft 2 to which is screwed a sleeve 3, formed with a helical groove which constitutes the inner race for balls 4. The external race is formed in a sleeve 5 secured to the propeller blade in the manner to be further described.

The cage 6 of the ball bearing has a shoulder or flange 6a, provided with recesses for the insertion of motion proportionating levers 7, which are spaced along the periphery. Each lever is cylindrical and has three ball-shaped parts i. e. a central part engaged in the shoulder 6a of cage 6, an outer ball part engaged in a recess of sleeve 5 and an inner ball part engaged in a recess 8b formed in a fixed ring 8, secured to sleeve 3 by teeth 8a. Ring 8 carries a flange 8c for limiting the outward motion of a bevel pinion 9.

Said gear wheel 9 meshes with a pinion 10, keyed to the end of the driving shaft. The hub 9a of pinion 9 is splined to sleeve 5 and is prevented from moving in the direction of the axis of the propeller blade by the flange 8c of ring 8, thus causing a relative axial movement between pinion 9 and sleeve 5, when to the latter is imparted a helical movement.

A shoulder 5a of sleeve 5 serves as a stop for the metallic hollow blade 11, which is riveted between two sleeves 12—13, the latter having a flange secured to shoulder 5 by bolts 14.

An internal sheet metal member 15, engaging a packing member 16 and soldered to sleeve 5, forms an oil chamber for the lubrication of the ball bearings, oil being supplied by an orifice closed by a plug 17.

A stop 18, held by a nut 19 provided with a nut-lock 20, limits the allowable axial displacement of sleeve 5 corresponding to the maximum torsion.

Shaft 2, which is partially shown in the drawings supports the propeller blade upon a part of its length, and withstands jarring motion and distortion.

The hub 2a of shaft 2, keyed to the shaft 1 is provided with a sleeve 21, having a flanged portion 21a, which carries studs 26 for attaching spiral springs 22 which are spaced in suitable number around the driving shaft (only one spring being shown in the drawings); flange 21a is movable with the crankshaft, but it is not affected by the torsion of the blades. A disk 23a integral with a sleeve 23, keyed to bevel gear 10 and centered by a bearing 24, carries a stud 25 to which is attached the other end of the respective spring 22. Disk 23a is thus displaced with reference to disk 21a when pinion 10 rotates, by the action of the helical movement of sleeve 5.

Figure 2 is a plan view showing the limit positions 25—25a of stud 25 corresponding to the extreme positions of the blades in their torsional movement.

A casing 27 and a cover 28 surround the springs, pinions, etc..... and is tightly sealed by packing members 29—29a—30.

The operation is as follows:

The propeller blade during its rotation, is subjected to centrifugal force, which is imparted through shoulder 5a to the outer ball bearing race 5. Since the groove of said race is helical, the force has two components, whereof one is tangential and the other normal. The latter is absorbed by the balls 4. The tangential reaction causes rotation of the blade, of bevel gears 9—10 and of disk 23a. The springs 22 are thus put under tension and their flexibility is determined according to the angle of rotation required to vary the pitch.

At the ground, the springs will balance a certain tangential stress. When flying in altitude, the centrifugal force will automatically increase, since the air pressure is smaller and the propeller thus tends to race. This causes a rotation of the blades against the springs 22. The variation of the pitch brakes the propeller and reduces its speed. It will be observed that the desideratum is to obtain a constant speed, whereas, in the case of a propeller with constant pitch, the speed increases rapidly with the altitude. With a propeller according to the invention, the speed increases according to an intermediate law of progression, the speed for each altitude corresponding to the position of equilibrium of the blade at this altitude. Due to the variable pitch obtained by this arrangement, the propeller absorbs a greater power at a given altitude, than a constant-pitch propeller.

The purpose of the mounting of cage 6 by means of motion proportionating levers 7 is the following:

When in operation, the balls and the cage are subjected to centrifugal force, and tend to move outwardly, even though the propeller blade is stopped in its movement by the springs; it is however quite necessary to limit the motion of the cage and balls, in order to prevent the cage from constantly striking against the inner shoulder 40 of the sleeve 5, and this is the object of levers 7, one end whereof is mounted in ring 8, the opposite end being mounted in sleeve 5, while the middle part is at the proper distances from the ends in such manner that the ratio of said distances or leverages will afford the desired motion of cage 6.

At rest, that is when the springs 22 urge sleeve 5 to the left (Fig. 1) so as to bear against ring 8 through the medium of levers 7, the latter are parallel with the blade axis. As sleeve moves away from shaft 1, while rotating about shaft 2, due to centrifugal force, the right hand heads of levers 7 will rotate with respect to the left-hand heads thereof, whereby levers 7 will assume a progressively inclined position with respect to the blade axis, as the centrifugal force increases. Hence, the central portions of levers 7 will rotate cage 6 in the same direction as sleeve 5, but through a smaller angle, the ratio of movement of cage 6 with respect to sleeve 5 being constant and determined by the ratio of said leverages.

Levers 7 further determine the displacement of cage 6 in such manner that it will exactly correspond to that of the balls, which latter should roll without slipping, and this displacement of the balls chiefly depends upon the diameter of the balls and their races.

The springs shown in Figures 1 and 2 may be replaced by other resilient means, and, as shown in Figures 3 and 4, the elastic members may consist of a series of concave spring washers 31. The bevel pinion 10, driven by pinions 9, is mounted as before upon the bearing 24, which is centered on the support 21a secured to the hub 2a. Telescoping rods 32—33 are engaged at their cylindrical ends 32a—33a in corresponding recesses of pinion 10 and support 21a. The spring washers are centered on said rods and are guided in a socket 35.

Obviously, the aforesaid arrangements are given solely by way of example, and any other suitable arrangements may be provided for the purpose.

Having now described my invention, what I claim as new and desire to secure by Letters Patent is:

1. A variable pitch propeller comprising in combination a member secured to the driving shaft, a blade rotatably and axially movable on said member, a ball bearing cage between said member and blade, balls held by said cage and movable in helical grooves of said member and blade, a motion proportionating device for connecting said cage with said blade and member, and yielding means for opposing said helical motion.

2. A variable pitch propeller as claimed in claim 1, wherein said motion proportionating device comprises a set of levers, one end of which is operatively connected with said member, the opposite end with said blade and an intermediate portion with said cage.

3. A variable pitch propeller comprising in combination a member secured to the driving shaft, a blade rotatably and axially movable on said member, means for connecting said member with said blade whereby centrifugal force acting on said blade causes helical motion of the latter, a bevel pinion splined to said blade, a bevel pinion loose on the driving shaft and meshing with the former, and yielding means for connecting said pinions with one another.

4. A variable pitch propeller as claimed in claim 3, comprising a disk secured to the driving shaft and a disk secured to said loose pinion, said yielding means consisting of spiral springs connecting said disks with each other.

5. A variable pitch propeller as claimed in claim 3, comprising a disk secured to the driving shaft, telescoping members connecting said disk with said loose pinion, and arranged in a plane at right angles to the axes of said disk and pinion, said yielding means consisting of elastic members surrounding said telescopic members and opposing the telescopic motion thereof.

MARIUS JEAN-BAPTISTE BARBAROU.